(12) United States Patent
Cens et al.

(10) Patent No.: US 6,959,140 B2
(45) Date of Patent: Oct. 25, 2005

(54) LIGHT PATH

(75) Inventors: Fabien Cens, Massy (FR); Marian Faur, Massy (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 335 days.

(21) Appl. No.: 10/062,162

(22) Filed: Feb. 1, 2002

(65) Prior Publication Data

US 2002/0106179 A1 Aug. 8, 2002

(30) Foreign Application Priority Data

Feb. 2, 2001 (FR) .............................. 01 01454

(51) Int. Cl.⁷ ............................................. G02B 6/00
(52) U.S. Cl. ................................................... 385/138
(58) Field of Search ........................... 385/138, 62, 72, 385/78, 56–59, 132, 134; 428/629, 632, 660; 356/364, 367, 368

(56) References Cited

U.S. PATENT DOCUMENTS

| | | | |
|---|---|---|---|
| 3,868,511 A * | 2/1975 | Basso et al. | 250/376 |
| 4,296,996 A | 10/1981 | Niiro et al. | |
| 4,779,788 A | 10/1988 | Rossberg | |
| 5,155,795 A | 10/1992 | Wasserman et al. | |
| 5,281,204 A | 1/1994 | Horie et al. | |
| 5,933,238 A * | 8/1999 | Ikuta et al. | 356/364 |
| 6,189,565 B1 * | 2/2001 | Skog | 137/554 |
| 6,221,513 B1 | 4/2001 | Lasater | |
| 6,351,593 B1 * | 2/2002 | Pollack et al. | 385/138 |

FOREIGN PATENT DOCUMENTS

| | | |
|---|---|---|
| DE | 19734274 | 2/1999 |
| EP | 0508894 | 10/1992 |
| GB | 2104752 | 3/1984 |
| GB | 2310050 | 8/1997 |
| GB | 2360854 | 3/2001 |
| JP | 60-180183 | 9/1985 |
| JP | 61-289306 | 12/1985 |
| JP | 8-211232 | 8/1995 |
| WO | WO 0036386 | 6/2000 |

OTHER PUBLICATIONS

Advertising Brochure: "Only Kryoflex® is hermetic now ... hermetic forever", *Pacific Aerospace & Electronics*, Inc., (no date).

Advertising Brochure: "Hermetic Multiple Fiber Optic Feed–through" *Pacific Aerospace & Electronics*, Inc., (no date).

* cited by examiner

*Primary Examiner*—J. F. Duverne
(74) *Attorney, Agent, or Firm*—Victor H. Segura; Brigitte L. Echols

(57) ABSTRACT

A light path extending between first and second zones that are sealed relative to each other by a sealing gasket is provided. The light path includes at least one optical fiber. The optical fiber is provided with a metal coating and passes through the sealing gasket.

11 Claims, 2 Drawing Sheets

LIGHT PATH

BACKGROUND OF THE INVENTION

1. Field of the Invention

The invention relates to the field of light paths. A particular application of the invention relates to light paths for connecting optical measuring means situated in effluent coming from a well passing through underground formations, such as a well for oil, water, or the like.

2. Description of Related Art

Numerous light-path applications relate to devices in which the optical fiber(s) connected to the sensor(s) for measuring purposes are to be found in a medium which is wet or corrosive and in which temperature and pressure can be high, while the electronic equipment to which connection is made must necessarily be located in a medium which is dry, clean, and preferably under conditions of pressure that are close to atmospheric conditions. This problem of providing sealing between optical fibers and electronic equipment (placed in a protective enclosure) can be solved by using a leakproof fiber feedthrough at the boundary between the two media. French patent application No. FR 00/12250 filed on Sep. 25, 2000 in the name of the Applicant describes an embodiment of a fiber feedthrough adapted to such applications.

However a fiber feedthrough comprises an optical fiber that is stripped and inserted in a metal ferrule. Such feedthroughs are therefore fragile and relatively bulky if it is desired to pass a plurality of fibers, since each fiber must be inserted in a respective ferrule. Fiber feedthroughs are therefore very short and they are connected to the external measurement means and to the electronic equipment inside the tool via connectors situated on either side of said feedthrough. Unfortunately, connectors, which constitute mere couplings between two pieces of optical fiber, nevertheless also constitute an additional source of optical disturbances and faults, in particular because it is very difficult to join two fibers end to end without giving rise to losses in light transmission.

Furthermore, most prior art light paths make use of a component referred to as a "Y-coupler" situated between the fiber feedthrough and the means for emitting and receiving light. Such a component is Y-shaped and its function is to enable a single fiber extending between the feedthrough and the Y-coupler to convey light to a sensor (usually light from a diode or a laser) and to process the light returned by the sensor (usually by means of a photo detector). Nevertheless, since Y-couplers are manufactured using machining that is complex, and since they are generally intended for applications in ambient media, it is very difficult to adapt them to conditions of use at high temperature (i.e. greater than 150°). The reliability and the lifetime of the light path are severely affected thereby.

It is desirable to remedy those drawbacks by proposing a light path which provides the functions of conveying light to and from an optical sensor while minimizing light losses and faults.

SUMMARY OF THE INVENTION

In one embodiment, the present invention provides a light path extending between first and second zones that are sealed relative to each other by a sealing gasket. The light path includes at least one optical fiber. The optical fiber is provided with a metal coating and passes through the sealing gasket.

BRIEF DESCRIPTION OF THE DRAWINGS

Advantages and characteristics of the invention appear from the following description given with reference to the accompanying drawings, in which.

DETAILED DESCRIPTION OF THE INVENTION

Figure 1:
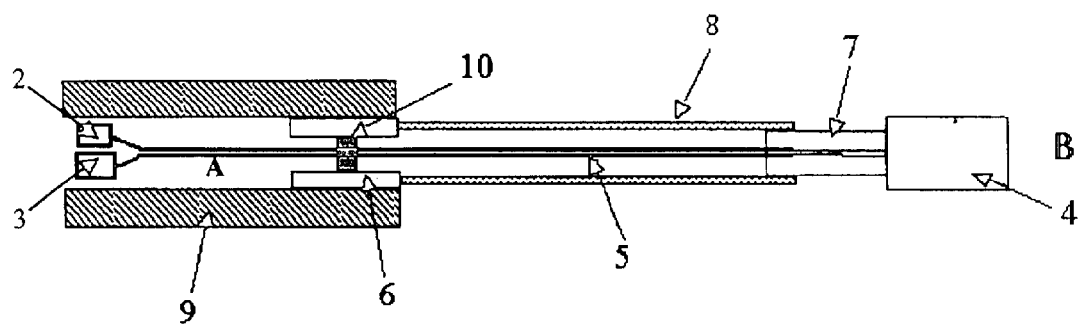
FIG. 1 shows a detail of an embodiment of a light path of the invention.

In one embodiment, the present invention provides a light path extending between first and second zones that are sealed relative to each other by a sealing gasket. The light path includes at least one optical fiber. According to the invention, said optical fiber is provided with a metal coating and passes through the sealing gasket.

In the light path according to one embodiment of the invention, there is no need to strip the fiber where it passes through the fiber feedthrough. It is therefore possible to use feedthroughs that are much longer without having to use optical connectors on either side of said feedthroughs. Furthermore, since the fiber can be extended and since a metal ferrule surrounding each fiber is omitted, it is possible to pass a plurality of fibers without excessively increasing the dimensions of the feedthrough, thus making it possible to connect one fiber to a light emitter and another fiber to a light receiver without using a Y-coupler. By not having to use a Y-coupler, the embodiment of the light path of the invention achieves light transmission efficiency and reliability over time that are significantly improved. Without the Y-coupler it is possible not only to use the light path of the invention in high temperature applications (about 150° C.) but also to decrease the number of connectors and thus to decrease the associated disturbances.

In one embodiment of the invention, the first zone is situated inside an optical measurement tool while the second zone is situated outside the tool. Particularly suitable applications then relate to the second zone being situated inside a production tube extending along a well passing through geological formations with a petroleum fluid flowing along the production tube, or to the second zone being situated in the cemented annulus that is to be found between the casing and the walls of a well passing through geological formations.

The light path according to one embodiment of the invention thus makes it possible to use an optical measuring tool in a medium that is wet or corrosive, specifically of the kind that is to be found in an oil well, without risk of damage. The gasket between the inside and the outside of the tool serves to protect the electronics in a manner that is low in cost, effective, and compact. The general design of the path also makes it possible under the same conditions of use to achieve good reliability in terms of light transmission along the path.

In one embodiment of the invention, the end of the optical fiber that is situated in the second zone is connected to an optical measurement device (sensor) via an optical connector. In this embodiment, the portion of the optical fiber situated in the second zone is contained in a protective tube that is permeable to said second zone. Also in one embodiment, the optical connector comprises a metal ferrule having one end of the optical fiber stuck therein, the end being stripped of the metal coating.

Since the metal-coated fibers are chemically insensitive, they may come into contact with external fluids. This greatly simplifies the light path of the invention. The optical fibers have one end connected to optical measuring device and this connection requires the use of a connector. If it were necessary to protect the fibers from the external medium, and thus to make the protective tube leakproof, then the connection between the tube and the connector would need to accommodate a pressure difference, and that is particularly difficult to achieve. In this embodiment, the non-sealed inside of the protective tube and the measurement device are both at the same pressure so the junction between these two elements can be made in very simple manner, e.g. by adhesive, which is particularly simple and low in cost. This type of connection also makes it possible to reduce the number of connectors between the fibers and the sensor since it is possible to stick a plurality of stripped fibers in a common metal ferrule.

In one embodiment of the invention, the end of the optical fiber that is situated in the first zone is connected to a light emitter device or to a light receiver device.

This solution thus makes it possible to omit the Y-coupler since it is possible to pass at least two fibers through the feedthrough and to connect one fiber to a light emitter device while the other fiber is connected to a light receiver device. The connector between the Y-coupler and the feedthrough is also omitted.

In another advantageous embodiment of the invention, the end of the optical fiber situated in the first zone is connected to an optical connector, the optical connector connecting it both to a light emitter device and to a light receiver device via secondary optical fibers.

In this embodiment, each fiber passing through the fiber feedthrough is used both for emission and reception since a connector connects each of them firstly to a light emitter and secondly to a light receiver. Nevertheless, a single light path of the invention can be used in this case to connect a plurality of optical measurement devices (sensors) (since the fiber feedthrough can still accept a plurality of fibers), thereby significantly decreasing the total bulk of measurement tools provided with this light path.

In one embodiment of the light path of the invention, inside the optical connector the ratio between the sections of the optical fibers is representative of the quantity of light conveyed in each optical fiber.

This solution is very simple and easy to implement and makes it possible to enhance the quantity of light conveyed by one or other of the fibers by increasing the diameters of some fibers to the detriment of the diameters of other fibers.

One embodiment of the present invention provides an optical measuring device for use in a well for hydrocarbons, gas, water, or the like, the device comprising a measurement light sensor connected via a light path as defined above to device(s) for emitting and receiving light, said light emitting and receiving device(s) being situated inside a protective housing.

FIG. 1 shows a detail of how a light path 1 of the invention extends between a first zone A, e.g. situated inside the body of a tool 9 protecting a light emitter 2 and a light receiver 3, and a second zone B in which there is a measurement sensor 4, where the zones A and B are sealed relative to each other by means of a gasket 10. The light path comprises a pair of optical fibers 5 that are metal-coated and thus made chemically insensitive. It is therefore no longer necessary in the light path of according to one embodiment of the present invention to strip these fibers in order to insert them in a metal ferrule and then through a gasket at the boundary between the zones A and B as used to be the case in prior art feedthroughs. Thus, with considerably reduced bulk, it is possible to pass a plurality of fibers through a common gasket 10. It is therefore not necessary to provide a Y-coupler as in prior art light paths since a plurality of fibers can extend through the fiber feedthrough and can thus go either to a light receiver or to a light emitter. The number of connectors in the light path of the invention is also reduced by using "multifiber" connectors, i.e. by connecting a plurality of optical fibers to a common optical measurement device. These connectors are described in greater detail below.

In one embodiment of the light path of the invention, the gasket comes directly into contact with the metal coating on the fibers. By way of example, the gasket 10 is made of a ceramic compacted around the metal coatings of the fibers. In one embodiment, the gasket 10 includes a ceramic ferrule that may include Kryoflex® polycrystalline ceramic (Kryoflex) but the present invention is not limited to this material. Kryoflex, available from Pacific Aerospace & Electronics, Inc. of Wenatchee, Wash., is a multi-phase derivative of ceramic oxide crystalline silicates that provides, by way of oxygen pinned valence bonding, a direct union during the fusion processing of a ceramic-to-metal entity. The ceramic ferrule, through which is inserted the metal coated fiber, is inserted through the feedthrough 6 with a sealing layer of metallic foil or paste (not shown in the figure) positioned between the feedthrough and the ceramic ferrule. The ceramic ferrule is fixed into place an by heating the feedthrough with the ceramic sleeve and the fiber inserted therethrough to a sealing temperature within a range of approximately 1000–1100 C., but the present invention is not limited to this range of temperatures. This makes it possible to guarantee that the gasket provides very good sealing, capable of withstanding a difference of pressures between the inner part of the tool 9 (first zone) and the outer part of the tool 9 (second zone) exposed to an external pressure that may be the pressure inside an oil well. For more information related to the process of sealing in connection with the use of the ceramic ferrule see U.S. Pat. No. 6,221,513 B1 assigned to Pacific Coast Technologies, Inc, of Wenatchee, Wash. Thereafter, the sealing of the feedthrough itself, relative to the second zone B outside the tool body 9, can be achieved merely by means of O-rings that are not shown in order to clarify the drawing.

Figure 2:
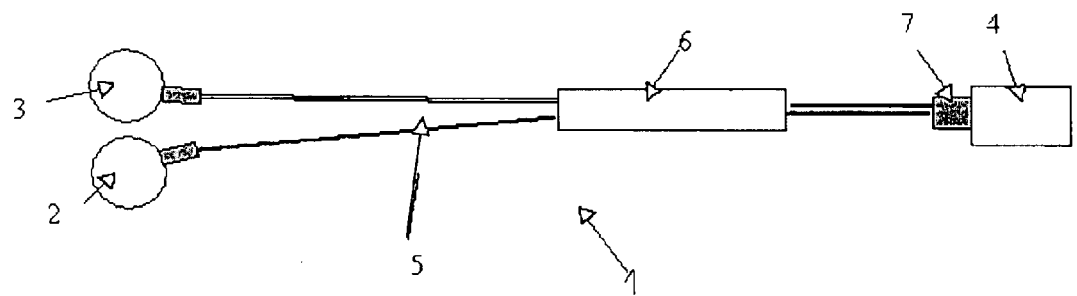
FIG. 2 is a diagram of a first embodiment of a light path of the invention.

Since they are not stripped, the optical fibers are much stronger, thus making it possible for the feedthrough to be of greater length, and consequently making it possible to connect said fibers directly to the emitter 2 or to the receiver 3 as shown in FIG. 2. In addition, the optical fibers no longer suffer when exposed to the wet and corrosive external medium. Nevertheless, in particular for the purpose of providing mechanical protection when handling the light path, the optical fibers 5 are inserted in a protective sheath 8 in the second zone B outside the tool. This sheath covers the fibers over substantially their entire length from the outlet of the fiber feedthrough 6 to the connector 7 which is finally connected to the measurement sensor 4. At its end remote from the sensor 4, the protective sheath is rigidly connected to the optical feedthrough 6.

Since the optical fibers 5 are metal-coated, it is no longer necessary for the protective sheath 8 to be leakproof. The sheath can be made of metal, thereby making it easy to connect to the feedthrough 6 which is often made of metal, and it can be pierced by holes to allow external fluids to pass through. The sheath can also be flexible and perforated or filled with a fluid such as silicone oil that is at the same pressure as the external medium. This characteristic of the light path of the invention is particularly advantageous since the fact that the sheath 8 is not leakproof makes it possible to ensure that pressure is equalized between the optical fibers 5 and the second zone B. This makes connection with the connector 7 very easy. Since the connector 7 is in pressure equilibrium, it can be made in the form of a simple metal ferrule in which the optical fibers, stripped of their metal coating, can be stuck. Stripping the fibers makes it possible to optimize fiber centering in the ferrule and facilitates good optical coupling with the measurement sensor 4. It is also possible to dimension the section of the fibers connected in the connector so that the ratios between the various sections is representative of the quantities of light they carry.

An embodiment of a light path of the invention is shown in FIG. 2. The light path 1 enables the pair constituted by the emitter 2 and the receiver 3 to be connected to the corresponding measurement sensor 4. In an embodiment, the light emitter is a diode and the light receiver is a photosensitive cell. The light path 1 comprises a pair of optical fibers 5 extending through the fiber feedthrough 6. One of the fibers 5 connects the light emitter to the sensor 4 while the other optical fiber connects the light receiver to the sensor. The number of fibers 5 in each light path depends on the number and type of sensors used, with the feedthrough 6 enabling a plurality of fibers to pass therethrough between the first zone A inside a tool (not shown) and the second zone B outside the tool. The fibers and the sensor are interconnected by means of a connector 7 that can receive a plurality of fibers.

This embodiment illustrates the fact that the light path of the invention makes it possible not only to omit the Y-coupler but also to omit the connectors present on either side of the feedthrough in prior art light paths. This feature makes light transmission along the path of the invention particularly reliable, and it also significantly increases the lifetime of the path, thereby reducing the costs associated therewith. With this type of light path, it is also possible to increase the number of optical fibers passing through the feedthrough and as a result to connect a plurality of optical sensors using a single feedthrough, thereby significantly reducing the size of tools provided with a light path of the invention compared with prior art light paths where the fact that each optical fiber must be inserted in a respective metal ferrule prior to being placed in the gasket 10 puts a limit on the number of fibers that can be passed through the same feedthrough.

Figure 3:
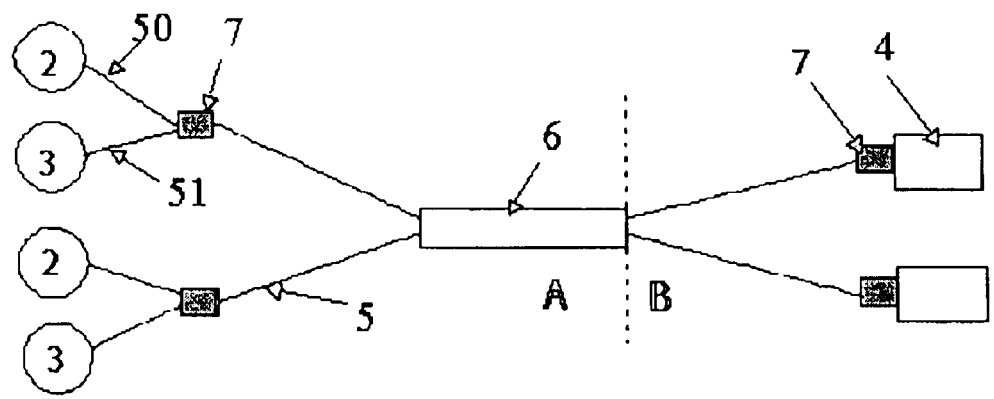
FIG. 3 is a diagram of another embodiment of a light path of the invention.

FIG. 3 shows another application of a light path of the invention. In this application, each optical fiber 5 is connected via a first connector 7 to secondary optical fibers 50, 51 situated on one side of the feedthrough 6, and via a second connector 7 to a measurement sensor 4 situated on the other side of the feedthrough. The gasket 10 in the feedthrough serves to seal the second medium B relative to the first medium A in the same manner as in the feedthrough shown in FIGS. 1 and 2. The secondary optical fibers 50 and 51 are connected respectively to an emitter 2 and to a receiver 3. This embodiment also makes it possible to omit the Y-coupler as in prior art light paths. It is the connector 7 which provides the connection between the secondary fibers 50, 51 and the optical fibers 5.

Although this embodiment requires the use of an additional connector for each optical fiber 5 that passes through the feedthrough 6, this solution nevertheless remains most advantageous since it makes it possible to minimize the number of optical fibers for connection with a plurality of optical sensors 4 via a single feedthrough. This makes it possible to decrease the overall cost of the path and also to simplify maintenance thereof. By reducing the number of fibers, the risk of having to replace the feedthrough in the event of one of the fibers breaking is likewise reduced.

Figure 4:
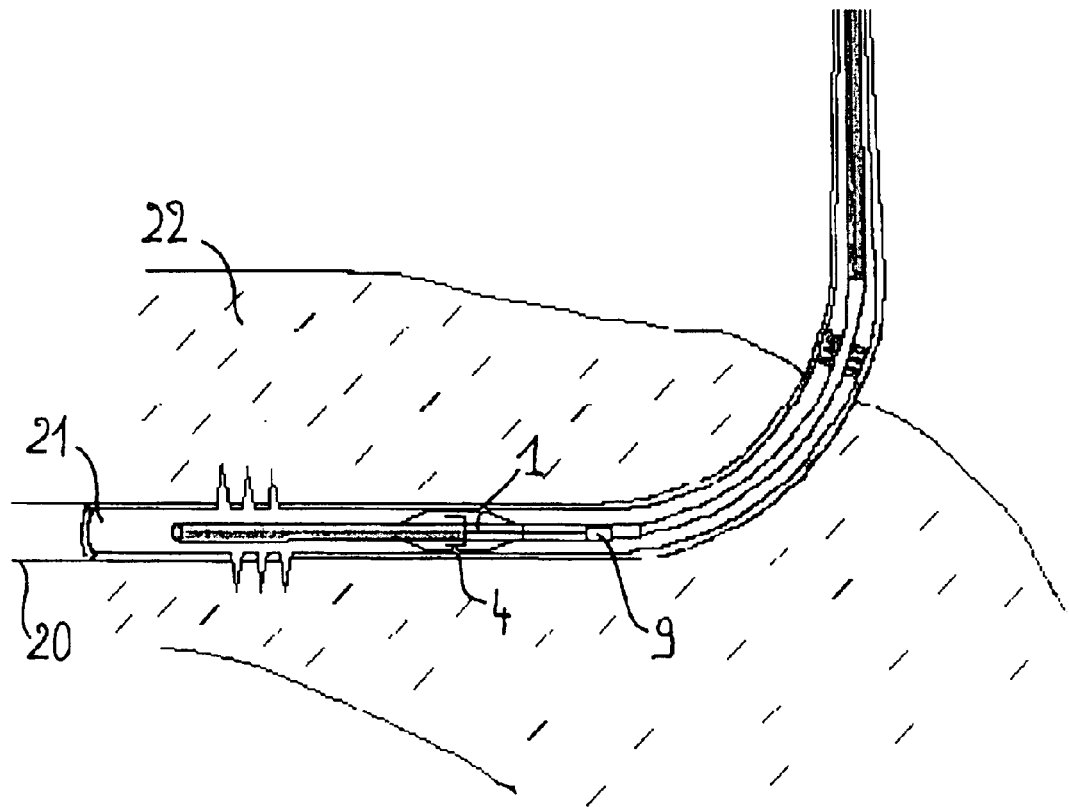
FIG. 4 shows an application of the light path of the invention.

FIG. 4 shows an application of a light path of the invention. In this application, a measurement tool 9 has been lowered down a well 20 that passes through geological formations and whose walls have covered by metal casing 21. The casing has been perforated in a hydrocarbon reservoir 22 so that the effluent coming from the reservoir flows into the well. The outside of the tool 9 is immersed in the effluent. At least one optical measurement sensor 4 is installed on an external portion of the tool in such a manner that said sensor sees the flow of effluent flowing along the well. By way of example, the sensor 4 can be used to make measurements for detecting the composition of the effluent. It is therefore necessary to protect the inside of the tool 9, i.e. the first zone A containing the light emitter and receiver from the medium in which the sensor is located, i.e. the second zone B, by connecting the sensor 4 to electronic measurement means situated inside the tool 9 by using a light path of the invention. Both the emitter and the receiver are unsuitable for withstanding high pressure and wetness in the effluent. Under such circumstances, the light path of the invention enables such measurements to be performed simply while guaranteeing high levels of reliability and durability for the light path. Thus, the sensor 4 is connected in a manner that is highly reliable and leakproof to the electronic means which are protected inside the tool from the effluent.

In another highly advantageously application of the invention, the sensor 4 is permanently mounted in a cemented annulus situated between the walls of a well and the walls of metal casing installed in the well. The light path of the invention with reliability and lifetime that are better than those of prior art light paths (having many connectors) is particularly adapted to this kind of application.

The light path of the invention is thus particularly useful and advantageous for connecting light emitters and receivers situated in a protected environment, such as the inside of the body of a tool, to optical measurement sensors situated in a medium which is wet and corrosive, which medium is subject to high temperatures and/or high pressures, such as the inside of an oil well, while nevertheless providing good both-way transmission of light in a compact manner. The pressure in an oil well may reach the value of 40,000 psi.

What is claimed is:

1. A light path extending between a first zone situated in the interior of an optical measurement tool and a second zone situated inside a well passing though geological formations, said first and second zones being sealed relative to each other, the light path comprising:

at least one optical fiber that is metal coated at least on the part of its length at the junction between said first and second zones; and a protective sheath which contains the portion of the optical fiber situated in the second zone;

wherein said protective sheath is separate from the optical fiber and is adapted to maintain the respective pressure inside the protective sheath substantially equal to the pressure inside the second zone situated inside a well passing though geological formations.

2. The light path of claim 1, wherein the protective sheath is permeable to said second zone, and said metal coating also extends over the portion of the optical fiber inside the sheath.

3. The light path of claim 1, wherein the end of the optical fiber that is situated in the second zone is connected to an optical measurement sensor via an optical connector.

4. The light path of claim 3, wherein the optical connector comprises a metal ferrule having one end of the optical fiber stuck therein, said end being stripped of the metal coating.

5. The light path of claim 1, wherein said first zone is situated inside an optical measurement tool and said second zone is situated outside said tool.

6. The light path of claim 5, wherein the second zone is situated inside a production tube extending in a well passing through geological formations, with a petroleum fluid flowing along said production tube.

7. The light path of claim 5, wherein the second zone is situated in the cemented annulus lying between the walls of a well passing through geological formations and casing of the well.

8. The light path of claim 1, wherein the end of the optical fiber that is situated in the first zone is connected to a light emitter or to a light receiver.

9. The light path of claim 1, wherein said first and second zones are sealed relative to each other by means of a sealing gasket such that the metal coating of the optical fiber comes directly into contact with said gasket.

10. The light path of claim 9, wherein said sealing gasket is made of ceramic.

11. The light path of claim 10, wherein said ceramic is compacted around said metal coating.

* * * * *